United States Patent [19]

Arand et al.

[11] Patent Number: 5,259,689
[45] Date of Patent: Nov. 9, 1993

[54] COMPONENT CONNECTING MEANS ESPECIALLY FLANGE CONNECTING MEANS

[75] Inventors: Ernst B. Arand, Witten; Gerd Faulbecker, Hattingen; Hartmut Zoppke, Essen, all of Fed. Rep. of Germany

[73] Assignee: GKN Cardantec International, Essen, Fed. Rep. of Germany

[21] Appl. No.: 785,415

[22] Filed: Oct. 24, 1991

[30] Foreign Application Priority Data

Oct. 26, 1990 [DE] Fed. Rep. of Germany ....... 4034129

[51] Int. Cl.⁵ .............................................. F16B 13/04
[52] U.S. Cl. .................................. 403/337; 403/280; 403/282; 403/248; 403/16; 411/44; 411/502
[58] Field of Search .............. 403/280, 277, 248–250, 403/281, 274, 16, 371, 337, 156, 258, 282, 335, 297; 411/41, 60, 61, 44–46, 48, 57, 39, 502, 508, 510, 907

[56] References Cited

U.S. PATENT DOCUMENTS

| | | | |
|---|---|---|---|
| 1,131,073 | 3/1915 | Mosher et al. ....................... 403/156 |
| 1,700,354 | 1/1924 | Foss ................................... 411/57 |
| 2,941,439 | 6/1960 | Rapata ................................ 411/41 |
| 3,393,599 | 7/1968 | Fisher ................................. 411/41 |
| 3,962,843 | 6/1976 | King, Jr. .......................... 403/282 X |
| 4,022,536 | 5/1977 | Piepho et al. ........................ 403/16 |
| 4,276,806 | 7/1981 | Morel ................................ 411/46 X |
| 4,405,272 | 9/1983 | Wollar .............................. 411/57 X |
| 4,965,915 | 10/1990 | Steininger ......................... 411/41 X |
| 5,065,490 | 11/1991 | Wivagg et al. ..................... 411/60 X |
| 5,106,225 | 4/1992 | Andre et al. ....................... 411/57 X |

FOREIGN PATENT DOCUMENTS

2139869 2/1972 Fed. Rep. of Germany .
2201186 4/1975 Fed. Rep. of Germany .
2827031 10/1980 Fed. Rep. of Germany .
2109088 5/1972 France .

*Primary Examiner*—Randolph A. Reese
*Assistant Examiner*—Harry C. Kim
*Attorney, Agent, or Firm*—Harness, Dickey & Pierce

[57] ABSTRACT

The invention relates to component connecting fastener especially flange connecting fasteners for the propeller shaft in a motor vehicle. The two flanges 4, 5 contain bores 8, 9 which align with each other. Axially slotted tensioning sleeve 10 is introduced into each bore 8, 9. The tensioning sleeve 10 is axially elongated and radially expanded by tensioning pin 22 driven into bore 12. After completion of the assembly operation, contact face 17 provided at collar 16 is supported on contact face 18 of flange 4, with supporting face 20 being supported on abutment face 21 of further flange 5. In this way it is possible to automate the assembly procedure while requiring less space and achieving a higher compression between flanges 4, 5.

30 Claims, 9 Drawing Sheets

COMPONENT CONNECTING MEANS ESPECIALLY FLANGE CONNECTING MEANS

BACKGROUND OF THE INVENTION

The invention relates to component connecting means, especially flange connecting means for connecting a securing flange of a propeller shaft to the counter-flange of a motor vehicle. The component connecting means have tensioning elements arranged so as to be inserted into each other in bores located in the two flanges. The bores are distributed on the flanges and correspondingly align with each other. The tensioning elements furthermore are axially supported on contact faces of the flanges.

With such component connecting means as known in DE-AS 22 01 186, the tensioning elements are designed as hollow rivets whose engaging shanks are made to rest firmly against each other by being expanded. A specific axial compression cannot be achieved in this way.

FR-PS 70 34381 (publication No. 2 109 088) describes component connecting means where the tensioning element is a slotted tensioning sleeve with a tensioning pin inserted into it. The tensioning sleeve comprises a collar resting against one of the components. The tensioning sleeve end projecting from the bores of the components is made to rest against the bore edge of the second component by being expanded when inserting the tensioning pin and is held as a result of its conical design. However, again it is not possible to achieve a specific axial compression of the components.

SUMMARY OF THE INVENTION

The securing flange of a propeller shaft is connected to the counter-flange in a motor vehicle generally by using bolts. The purpose of such bolts is to achieve a specific compression of the components to be connected to each other. The disadvantage of such a design is that the space available in the vehicle for assembly purposes is small. However, applying spanners or wrenches for bolting operations requires a certain amount of space. Furthermore, bolted connections are not advantageous for being automated in an assembly operation.

It is an object of the present invention to provide flange connecting means in the case of which a specific compression can be achieved in an automatic assembly operation. Another object of the present invention is to provide a flange connecting means or fastener which requires less space for assembly purposes and permits a more compact flange design.

In accordance with the invention, an objective is achieved by tensioning elements consisting of a tensioning sleeve provided with axial slots starting from the end that is first introduced into the bore, i.e., its introduction or introducing end, and a tensioning pin insertable into said sleeve at its end opposite its introduction end. The tensioning sleeve comprises a stop or collar at the end opposite its introduction end whose contact face is supported on a contact face of the workpiece, e.g. a flange. At the introduction end, the tensioning sleeve comprises a further collar with a supporting face which, after having been radially expanded by the tensioning pin, rests against an abutment face of the other workpiece, e.g. a counter-flange.

The slotted design of the tensioning sleeve allows it, initially, to be inserted without the tensioning pin to achieve an initial alignment of the components to be connected.

The free axial length of the tensioning sleeve between the contact face of the collar and the supporting face of the further collar, prior to assembly, is smaller than the distance between the contact face and the abutment face of the adjoining workpieces or flanges. When inserting the tensioning pin, the tensioning sleeve is elongated to the required extent to be able to achieve the desired compression. The tensioning pin remains in the tensioning sleeve and thus prevents the connection from being unfastened. In the usual case the axial length is dimensioned in such a way that it is smaller than the distance between the flange contact faces by an amount which corresponds at least to the elastic elongation of the tensioning sleeve, and is below the elongation at which the tensioning sleeve would rupture or shear.

In another embodiment the supporting face of the further collar is inclined at an angle relative to the longitudinal axis of the tensioning sleeve, said angle deviating from the right angle; it preferably amounts to 60°. This inclination or chamfer helps bridge any tolerances and helps achieve the necessary compressive force while keeping the force required for driving in the tensioning pin as low as possible. In a preferred embodiment, the abutment face of the flange also extends so as to be inclined, its inclination corresponding to the inclination of the supporting face of the tensioning sleeve.

Several alternative tensioning pin designs are possible. In one embodiment, the tensioning pin is shorter than the tensioning sleeve. However, its length may also correspond to the length of the tensioning sleeve or it may be greater than the length of same.

In another embodiment the tensioning pins which are as long as or longer than the tensioning sleeve are provided with a head.

To prevent release of the connection a further embodiment provides that after completion of the assembly operation (i.e., after the tensioning pin has radially expanded the further collar), the tensioning pin should be secured against being pulled out of the tensioning sleeve. There are several alternative solutions to achieve such an objective. In a preferred embodiment, a securing ring secures the tensioning pin relative to the tensioning sleeve to prevent it from being pulled out. This can also be achieved in the case of a tensioning pin with head by having the end projecting from the tensioning sleeve after assembly provided with a groove for introducing a securing ring. Alternatively, the securing ring may be located in corresponding grooves of both the tensioning sleeve and the tensioning pin. It is also possible for the tensioning pin, at its end, to be provided with locking projections which, after having passed the bore of the tensioning sleeve, rest against the end face of the tensioning sleeve nearest to the supporting face. Furthermore, it is possible to provide the tensioning sleeve and the tensioning pin with micro-teeth which engage after completion of the assembly operation. A glued connection is conceivable, but it is also possible to combine a glued connection with micro-teeth. For example, one of the components may be provided with micro-teeth whereas the other component comprises a micro-encapsulated glue which is activated when it is in proximity to the micro-toothed layer. A further alternative has the tensioning sleeve, in its bore, containing a recess for accommodating the tensioning pin in the assembled condition in the region of the introduction end.

To facilitate pre-assembly of the flange connection, a further embodiment of the invention has an annular edge in the bore of the counter-flange towards the abutment face. If pre-assembly is carried out manually, the tensioning sleeve, with its radially projecting introducing end, (e.g. the less than fully expanded further collar) engages the annular edge, thereby holding the two flanges so that they contact each other in order to facilitate subsequent final assembly when the tensioning pin is driven in.

The tensioning sleeve, on its outer portion adjoining the collar and extending into the bore of the flange can be provided with a thickened or raised portion. This is a preparatory measure to facilitate final assembly prior to final assembly. The thickened portion temporarily holds the sleeve in the bore of the flange. The tensioning sleeve can be disposed in the flange in a pre-assembly condition, which facilitates alignment and hence final assembly with the counter-flange.

For dismantling purposes an embodiment of the tensioning sleeve may have in its bore an annular face which serves as a supporting base for an ejecting tool. The annular face is arranged so as to face away from the introduction end of the tensioning sleeve. Ejection is effected in the direction of the introduction end. In the process, the segments of the tensioning sleeve are pressurized until they tear off due to the action of the ejecting tool.

In a design variant, the annular face forms part of a bored step starting from the collar of the tensioning sleeve. In the case of a design where the tensioning pin in the assembled condition is accommodated in a recess in the tensioning sleeve, the recess edge and the abutment of the tensioning pin with the recess edge are used as supporting bases for the ejecting tool.

Furthermore, for dismantling purposes, in accordance with the invention the tensioning pin can be provided with a threaded through-bore. For extraction purposes, a bolt may be inserted into said through-bore and the tensioning pin pulled out by rotating the bolt. Extraction of the tensioning sleeve is facilitated by having the tensioning sleeve, at either or both ends of its bore comprise a stop shoulder for bearing against the bolt during the withdrawal of the tensioning pin.

Another alternative for releasing the connection consists in destroying the tensioning sleeve or its segments. In one embodiment, the tensioning sleeve is removable by a mandrel which is pressed into the bore from the stop or collar end and destroys the segments. To facilitate destruction, the tensioning sleeve may be provided with a conical bore which extends past the collar tapering inward and reaches as far as the segments. Furthermore, the segments may be destroyed by applying a high tensile force to the tensioning sleeve. For this purpose the bore of the tensioning sleeve should be designed as a threaded bore in the region of the collar for a withdrawing pin or bolt.

Furthermore, the segments may be destroyed by twisting the tensioning sleeve. For this purpose, the collar of the tensioning sleeve may be designed as a bolt head to permit engagement of a spanner wrench. A further spanner may be used for engaging the other collar. The segments are destroyed by twisting the two ends relative to each other via the engaging spanners.

BRIEF DESCRIPTION OF THE DRAWINGS

Preferred embodiments of the invention are illustrated in the drawings wherein:

FIGS. 15-25 illustrate various alternative embodiments in partial cross-section.

DETAILED DESCRIPTION INCLUDING PREFERRED EMBODIMENT

Figure 1:
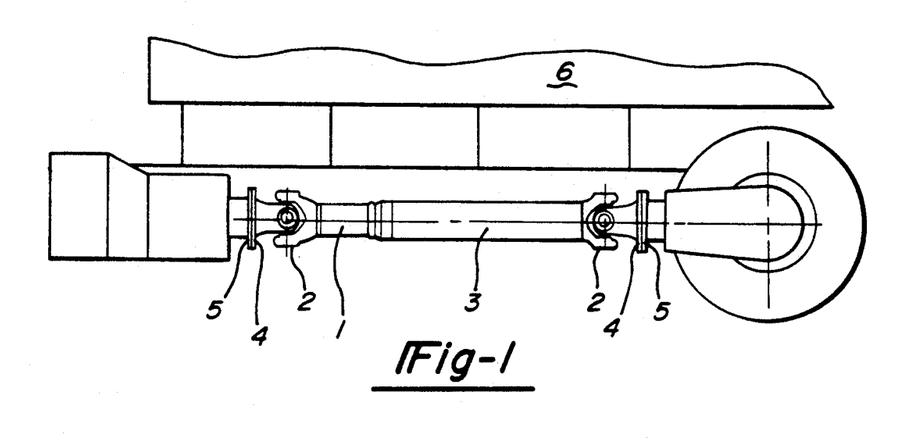
FIG. 1 illustrates diagrammatically a propeller shaft with flange connections as used in a truck.

FIG. 1 shows a propeller shaft 1 fitted in a vehicle drive line. The vehicle driveline is only partially illustrated. The propeller shaft 1 consists of two joints 2 which are arranged at a distance from one another and connected to each other via an intermediate shaft 3. The free ends of the joints 2 are provided with flanges 4 which are connected to corresponding counter-flanges 5 of the vehicle driveline. For example, the one end of the propeller shaft 1 is connected to the counter-flange 5 attached to the gearbox output, whereas the flange 4 attached at the other end is connected to the counter-flange 5 of the axle drive or differential.

The design of the flange connecting means, detail Y, is shown in an enlarged scale in FIGS. 2 to 23 and will be explained below.

Figure 2A:
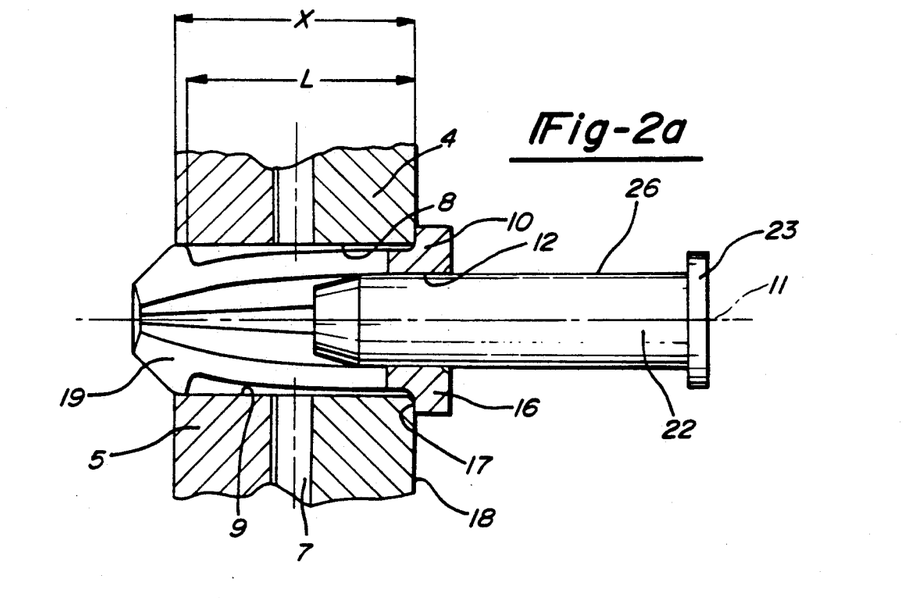
FIG. 2a is a partial cross-sectional view of an embodiment of the connection during assembly.
Figure 2B:
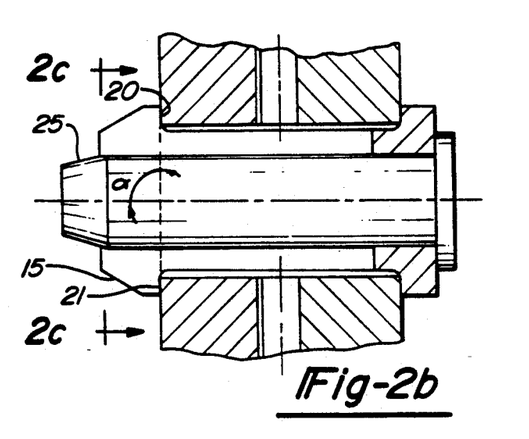
FIG. 2b is a partial cross-sectional view of the embodiment of FIG. 2a in an assembled condition.
Figure 2C:
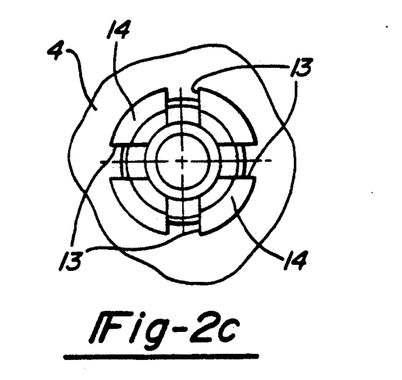
FIG. 2c is a view of the embodiment of FIG. 2b taken through line 2c-2c.

With respect to FIGS. 2a-c, on a radial face, the flange 4 associated with the propeller shaft has teeth 7 engaging corresponding counter-teeth of the counter-flange 5. The two flanges 4, 5 are provided with circumferentially distributed bores 8, 9 which aligningly correspond to each other. To secure the flanges 4, 5 relative to each other, a tensioning sleeve 10 is inserted into each of the corresponding bores 8, 9. The tensioning sleeve 10 comprises a bore 12 having an axis 11. At one end, the tensioning sleeve 10 is provided with a stop or collar 16. The other end is designed as the introducing end or introduction end 15. The tensioning sleeve 10 is provided with slots 13 which start from the introduction end 15, thereby forming segments 14. The segments 14 are resilient in the direction of the axis 11 when inserting the tensioning sleeve 10 into the bores 8, 9. The introduction end 15 is provided with a further collar 19 whose outer diameter is greater than that of the bore 9. The further collar 19 is provided with a supporting face 20 which, in the assembled condition as illustrated in FIG. 2b, engages behind the flange 5 and, with its supporting face 20, bears against the abutment face 21 of the flange 5.

The collar 16 is also provided with a contact face 17 which, when inserting the tensioning sleeve 10 into the bore 8, 9, may be made to rest against a contact face 18 of the flange 4. FIG. 2a shows the condition during assembly. It can be seen that the free length L of the tensioning sleeve 10 between the contact face 17 and the supporting face 20 is smaller than the distance between the two contact faces, i.e. between the contact face 18 of the flange 4 and the abutment face 21 of the counter-flange 5, which distance has been given the reference symbol X.

FIG. 2a shows tensioning pin 22 partially inserted into the bore 12 of the tensioning sleeve 10. Said tensioning pin 22 comprises a contact face 26 whose diameter is adapted to the diameter of the bore 12. At one end, it comprises a head 23 and at the other end a truncated conical face 25. Prior to final assembly, because of the dimension of the free length L of the tensioning sleeve 10, the further collar 19 and the segments 14 are flexible towards each other, as illustrated. The further collar 19 and the segments 14 are still inside the bore 9. When the tensioning pin 22 is displaced in the direction of insertion, for instance by a hydraulic tool, the tensioning sleeve 10, especially its segments 14, will be elongated continuously via the conical face 25 during the process of insertion of the tensioning pin 22. The further collar 19 with the supporting face 20 moves out of the bore 9 and when the tensioning pin 22 is inserted further, it is moved radially outwardly, with its supporting face 20 coming into contact with the abutment face 21. It can be seen that when assembled the supporting face 20 is inclined relative to the axis 11, the angle of inclination corresponding to a right angle. The elongation of the tensioning sleeve 10 results in a compression in the axial direction of the two flanges 4, 5 towards each other.

Figure 3A:
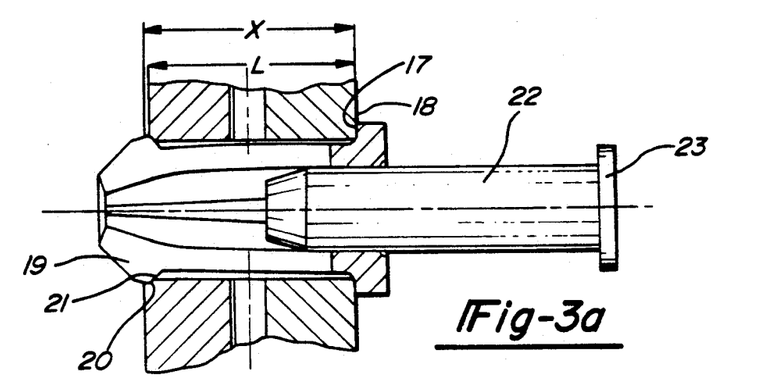
FIG. 3a illustrates a partial cross-sectional view of an alternative embodiment.
Figure 3B:
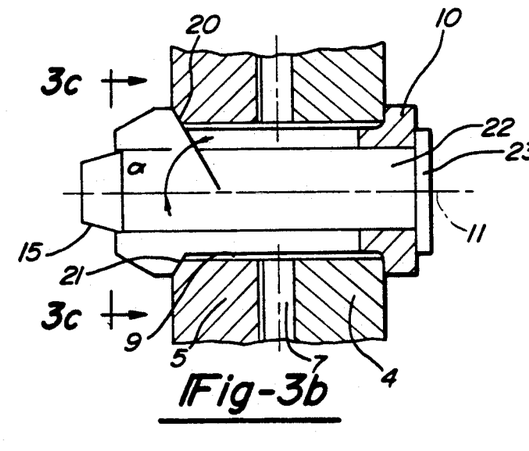
FIG. 3b illustrates a partial cross-sectional view of FIG. 3a in an assembled condition.
Figure 3C:
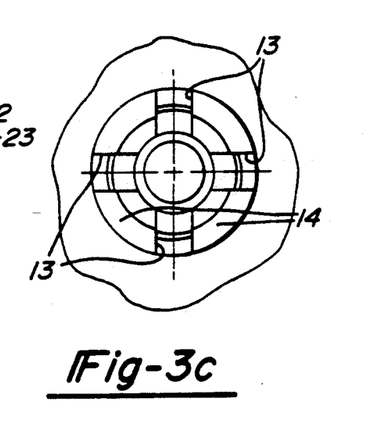
FIG. 3c illustrates the embodiment of FIG. 3b taken from line 3c—3c.
Figures 4, 5A:
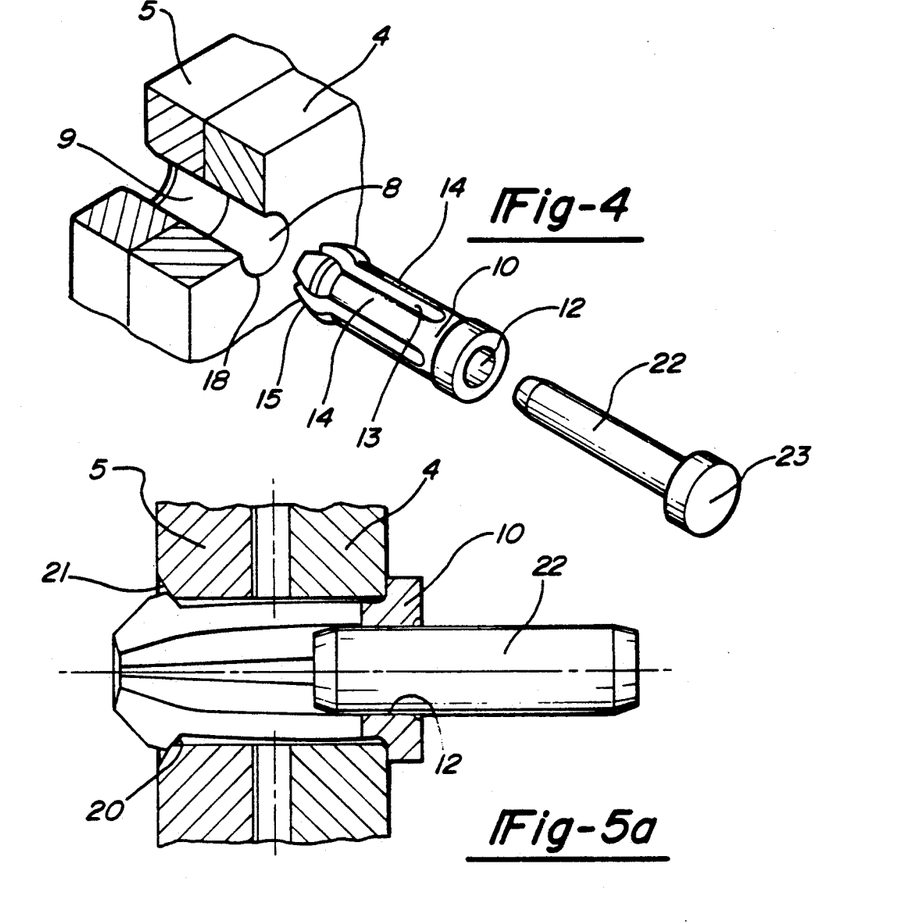
FIG. 4 is a perspective exploded view of an alternative embodiment of a flange connection.
FIG. 5a illustrates an alternative embodiment in partial cross-section during assembly.

The only difference between the embodiment shown in FIGS. 3 and 4 and the embodiment of FIG. 2 consists in that the supporting face 20 of the tensioning sleeve 10 does not extend at a right angle, but at an acute angle relative to the axis 11. The angle of inclination is most preferably 60°. Accordingly, the abutment face 21 is designed as a chamfer relative to the bore 9 of the flange 5. Elongation of the tensioning sleeve 10 is facilitated by the inclined orientation of the supporting face 20 when driving in the tensioning pin 22. The driving forces required to achieve the required compression are correspondingly smaller depending on the grade of steel selected. The change in lengths between the unassembled and assembled condition of the tensioning sleeve 10 (i.e., between FIG. 3a and 3b) is preferably such that elongation takes place in the range of plastic deformation.

An advantage of the inclined orientation of supporting face 20 and abutment face 21 consists in that any tolerances of dimension X are bridged while ensuring the desired compression between the two flanges 4, 5.

There is a further advantage in that after pre-assembling the tensioning sleeve 10, but prior to driving in the tensioning pin 22, the edge of the supporting face 20a engages behind the edge 21a of the abutment face 21 of the counter-flange. This allows axial securement of the flange 4 and counter-flange 5 before final assembly. This is advantageous when fitting the propeller shaft in the motor vehicle. The resilient segments 14 may be selected to have a stiffness allowing for manual insertion of the sleeve especially for pre-assembly condition.

FIG. 4 shows an exploded perspective view of the various components associated relative to each other. For simplicity, the teeth between the two flanges 4, 5 were not shown. First the tensioning sleeve 10 is inserted into bores 8, 9. Depending on the type of application, the resilient segments 14 may be inserted by hand. Elongation and expansion of the tensioning sleeve 10 of the introduction end 15 are subsequently achieved by inserting the tensioning pin 22.

Figure 5B:
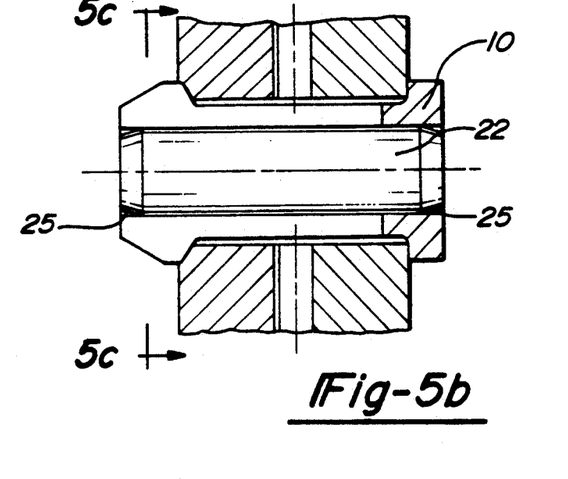
FIG. 5b illustrates the embodiment of FIG. 5a assembled.
Figure 5C:
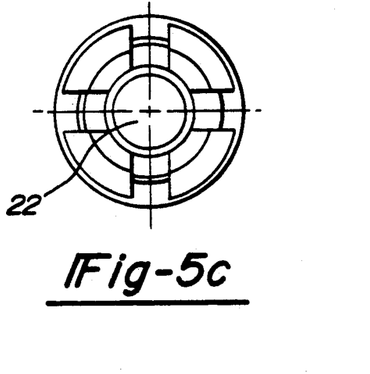
FIG. 5c illustrates an end view of the embodiment of FIG. 5b taken through line, 5c—5c.

In the case of the embodiment shown in FIGS. 5a–c, the tensioning pin 22 does not comprise a head; it merely comprises truncated conical faces 25 at its two ends, with the length of the tensioning pin 22 corresponding to the length of the tensioning sleeve 10. The tensioning function of the inclined supporting face 20 and of the correspondingly orientated abutment faces 21 is analogous to that described in connection with the embodiments of FIGS. 3a–c and 4.

Figure 6A:
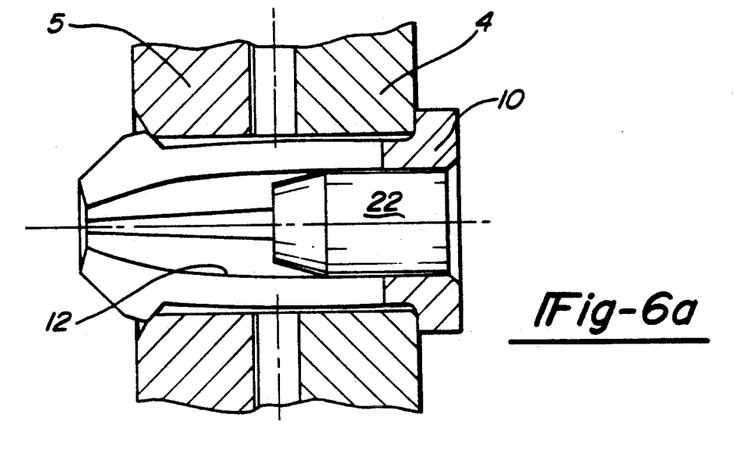
FIG. 6a and 6b show an alternative embodiment of the fastening means in partial cross-section during and after assembly respectively.
Figures 6B, 7, 7A, 7B:
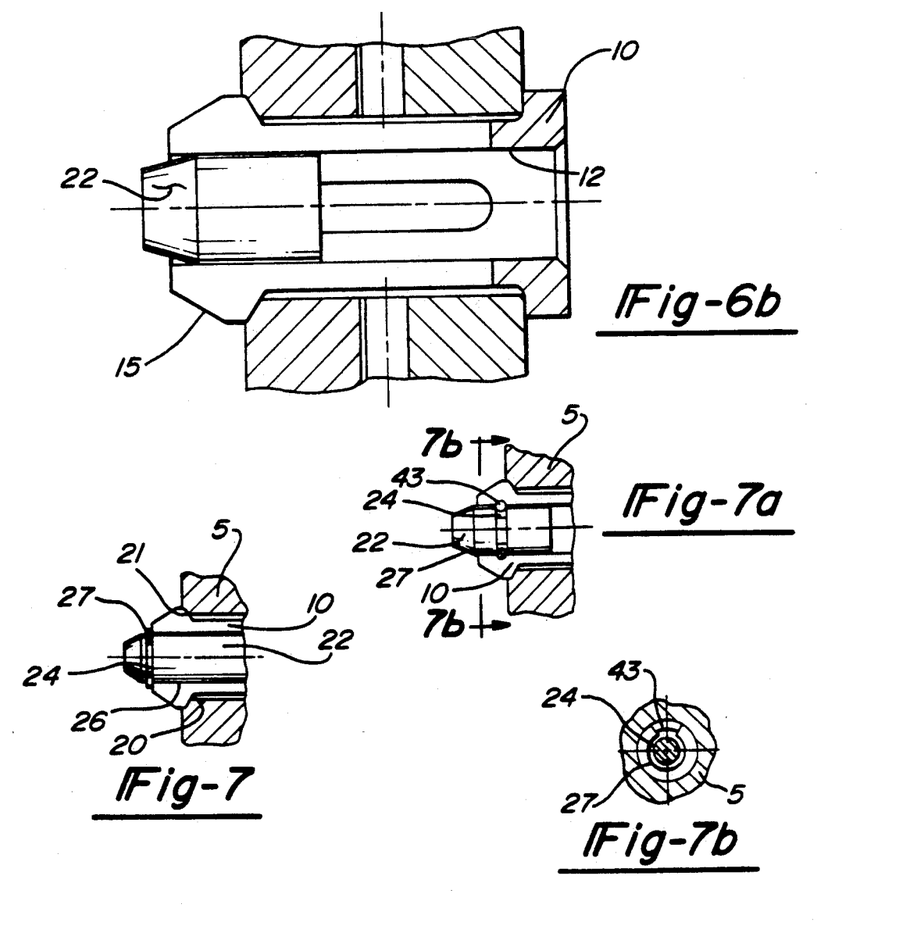
FIG. 7-11 illustrate various alternative embodiments in partial cross-section after assembling.

FIGS. 6a–b show another embodiment of the tensioning pin 22. Its length is shorter than that of the tensioning sleeve 10. One advantage of the shorter length is that the bore 12 in the tensioning sleeve 10 may be used for guiding a tool for inserting the tensioning pin 22. The design of the tensioning sleeve 10 corresponds to that described in connection with FIGS. 3a–c and 4. The tensioning pin remains in the position as illustrated in FIG. 6b to ensure that the collar formed in the region of the introducing end 15 of the tensioning sleeve 10 is supported radially outwardly.

Figures 8, 9, 10, 11, 12:
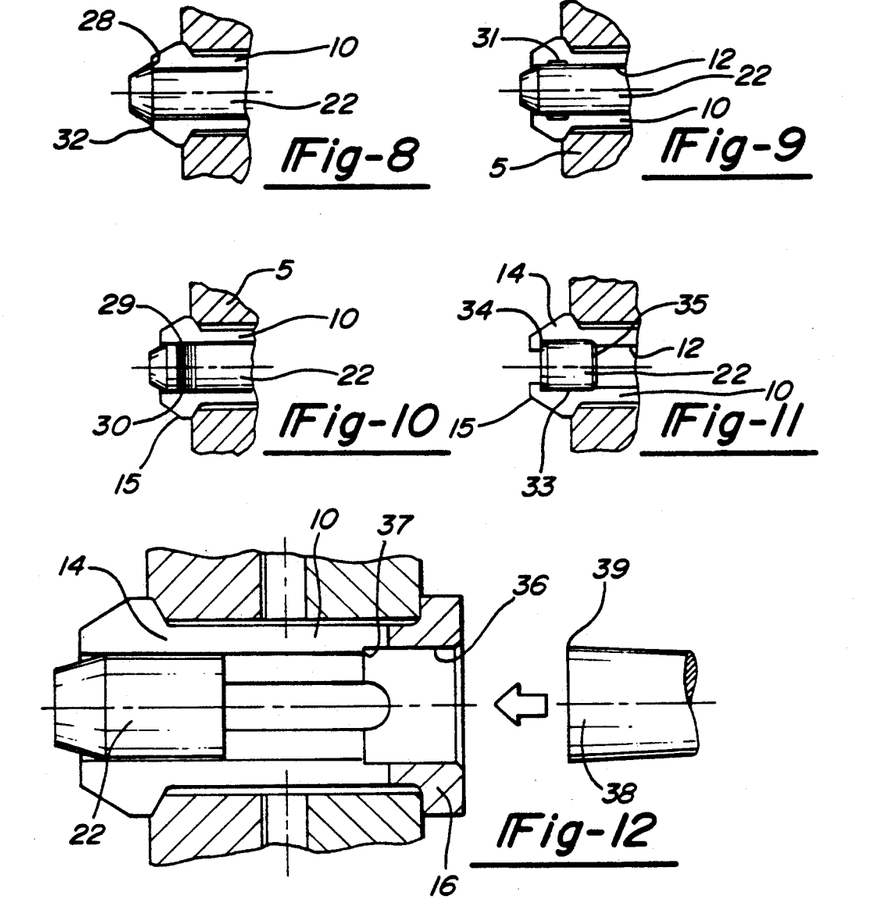
FIG. 12 illustrates in partial cross-section an alternative embodiment.

Although deformation of the tensioning sleeve 10 in the axial direction, i.e. in its longitudinal direction, preferably takes place in the range of plastic deformation, it is advisable for the tensioning pin 22 to remain in the bore 12 of the tensioning sleeve 10. To secure its position under operating conditions, there are several securing possibilities. Various embodiments are illustrated in FIGS. 7-11. For instance, a tensioning pin 22 whose axial length is greater than that of the tensioning sleeve 10, i.e. which axially projects therefrom in the assembled condition, may be secured by a securing ring 27 inserted into a groove 24 of the tensioning pin 22 as shown in FIG. 7. FIG. 7a shows further axial securing means for the tensioning pin 22. The tensioning pin 22 is provided with a groove 24 holding a securing ring 27. The bore of the segments 14 also comprise a groove 43 which may be contacted resiliently by the securing ring 27 when the tensioning pin 22 has reached its final position during the driving operation. FIG. 7b illustrates an end view as seen from line 7b—17b of the embodiment shown in FIG. 7a. A tensioning pin 22 projecting from the tensioning sleeve 10 may be secured as illustrated in FIG. 8, in which case the end of the tensioning pin 22 projecting from the tensioning sleeve 10 is provided with one or more circumferentially distributed locking projections 28 which may be axially supported on an end face 32 of the tensioning sleeve 10.

In the embodiment shown in FIG. 9, the bore 12 of the tensioning sleeve 10 is provided with a small recess provided with a layer of glue 31.

In the embodiment shown in FIG. 10, in the bore 12 of the tensioning sleeve 10, there are provided micro-teeth 29 which extend along a certain axial length in the region of the introduction end 15 and which cooperate with correspondingly positioned micro-teeth 30 on the outer face of the tensioning pin 22.

In the embodiment shown in FIG. 11, the bore 12 of the tensioning sleeve 10 near the introduction end 15 is provided with a recess 33 whose axial length corresponds to that of the tensioning pin 22. After having been driven in, the tensioning pin 22 is engagingly received between the shoulders 34 and 35 of the recess 33. This feature is advantageous for dismantling purposes. By applying a tool to the tensioning pin 22 in the direction of the introducing end 15 the tensioning pin 22 is supported on the shoulder 34 and when applying a sufficiently high ejection force the segments 14 of the tensioning sleeve tear off.

In the embodiment illustrated in FIG. 12, a bored step 36 is provided for dismantling the connecting means. The bored step 36 starts from the collar 16 and forms an annular face 37 as a contact face for the end face 39 of an ejecting tool 38. By applying a sufficiently high force via the ejecting tool 38 and its end face 39 to the annular face 37, the segments 14 of the tensioning sleeve 10 tear off, thereby unfastening the connection.

Figure 13:
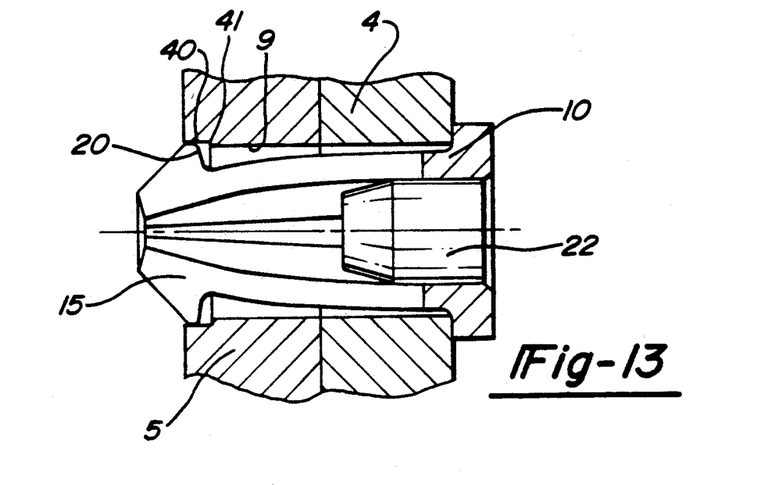
FIG. 13 illustrates in partial cross-section an alternative embodiment.

FIG. 13 shows an embodiment which permits the two flanges 4, 5 to be pre-secured relative to each other prior to achieving a final connection, i.e., prior to driving the tensioning pin 22 into the bore of the tensioning sleeve. For this purpose, the counter-flange 5 is provided with a recess 40 which starts from the abutment face of the said counter-flange. The diameter of the recess 40 is greater than that of the bore 9 and forms an annular edge 41 at the transition leading to the bore 9. This annular edge 41 may be used to ensure that the tensioning sleeve 10 is provisionally fixed and axially secured relative to the counter-flange 5. The supporting face 20 engages behind the annular edge 41, holding the flange 4 and the counter-flange 5 in approximately axial contact relative to each other.

Figure 14:
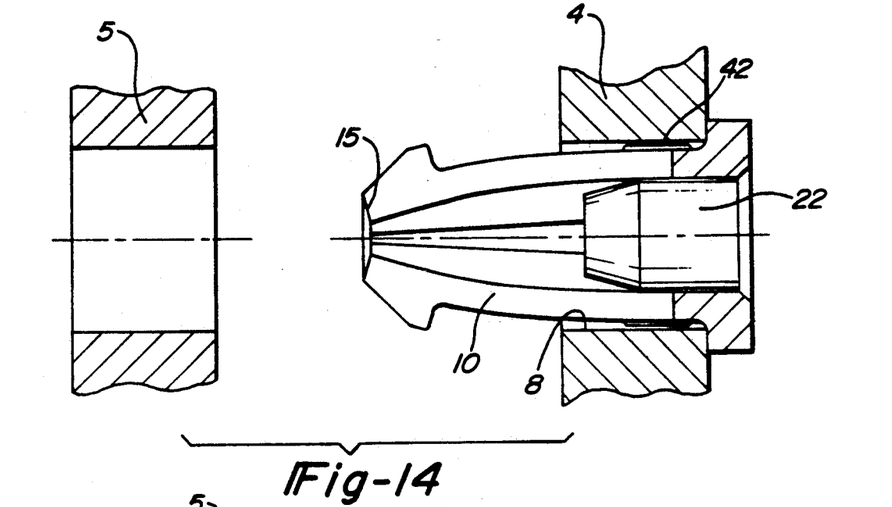
FIG. 14 illustrates in partial cross-section an alternative embodiment.

An alternative embodiment allowing pre-assembly of the tensioning sleeve 10 relative to the flange 4 is illustrated in FIG. 14. The tensioning sleeve 10, on its outer face adjoining the collar 16, is provided with a thickened diameter or raised portion 42. This thickened portion 42 is used to secure the tensioning sleeve 10 in the bore 8 of the flange 4. The thickened portion may extend across the entire circumference of the tensioning sleeve 10 or across individual segments 14 in the form of humps. The tensioning sleeve 10 is axially secured in the bore 8 of the flange 4 by being driven into the said bore. In this way it is possible, for example, to provide the entire flange 4 associated with a propeller shaft With tensioning sleeves 10 and then connect it to the counter-flange 5, which simplifies the alignment and/or assembly operation underneath the vehicle. Tensioning may also be achieved by driving in the tensioning pin 22 partially. For final assembly purposes, the tensioning pin is moved further in the direction of the introduction end 15.

Figure 15:
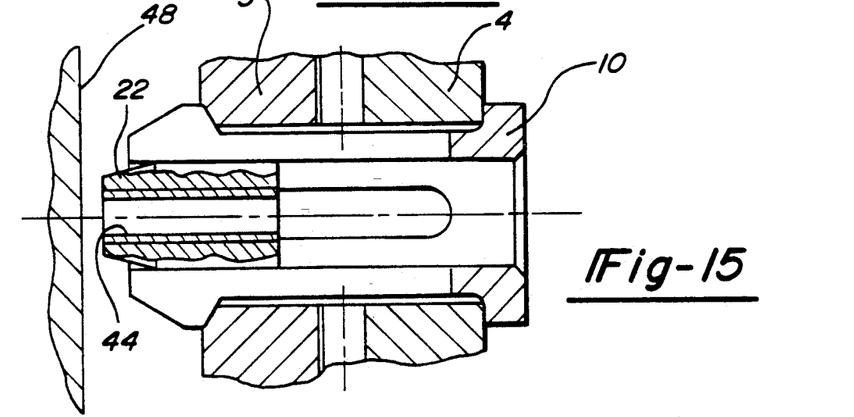
Figure 16:
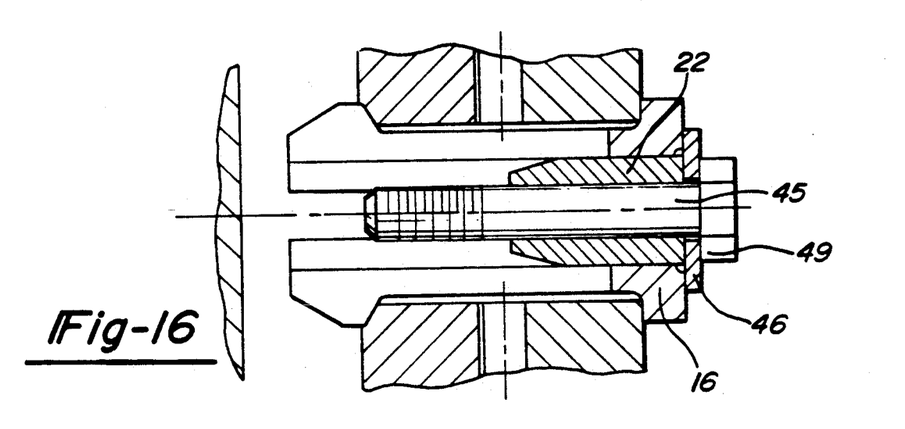

In the embodiment shown in FIG. 15, the tensioning pin 22 is provided with a threaded bore 44 permitting the tensioning pin 22 to be withdrawn from the tensioning sleeve. With restricted space conditions, this dismantling measure is advantageous in that the tensioning pin 22 does not have to be driven through the tensioning sleeve 10. FIG. 16 shows a possibility for removing the tensioning pin 22 via a commercial bolt 45 whose head 49 is supported on a supporting disc 46 resting on the collar 16. The tensioning pin 22 is pulled into the shank region of the tensioning sleeve 10 by engaging the bolt 45 with the threaded bore of the pin. The tensioning sleeve 10 may subsequently be withdrawn.

Figure 17:
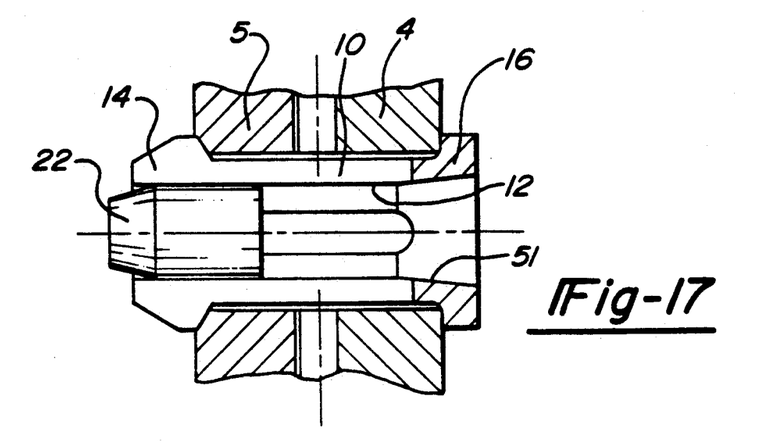
Figure 18:
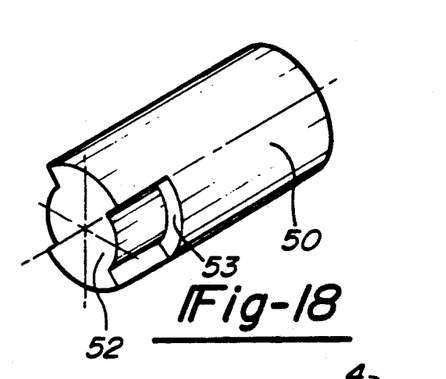
Figure 19:
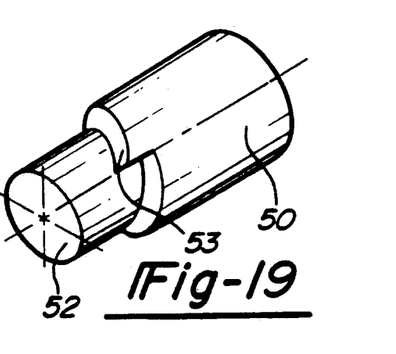
Figure 20:
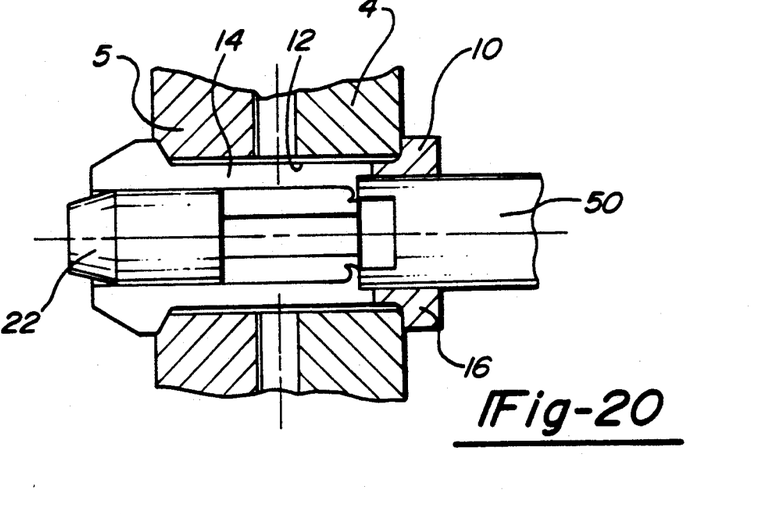

FIG. 17 illustrates another embodiment for the tensioning sleeve 10 in order to achieve a readily dismantleable connector by destroying the segments 14 For this purpose, the tensioning sleeve 10 is provided with a conical bore 51 which may be penetrated by a stepped mandrel (FIGS. 18-19), with a support face being provided through chip-forming in order to tear off the segments 14 (see FIG. 20). The mandrel 51 has at least one step (52, 53) to achieve a low ejection force. During the ejection process, the steps 52, 53, one after the other, enter the segments 14 and tear these off, one after the other. This means that the shearing force is limited to the level required for temporarily loading the segments 14.

Figure 21:
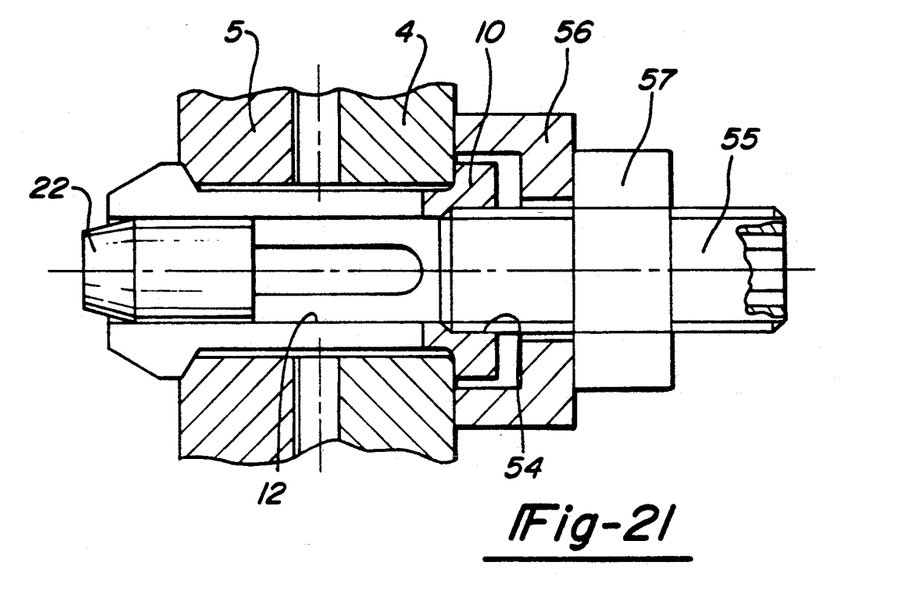

Referring to FIG. 21 the tensioning sleeve 10 is provided with an internal thread 54 into which threaded withdrawing pin 55 may be threaded. A force generated by tightening a withdrawing nut 57 may be supported via a bushing 56. The segments 14 will shear off and the tensioning sleeve 10 is thus destroyed achieving the objective of separating the flanges 4 and 5.

Figure 22:
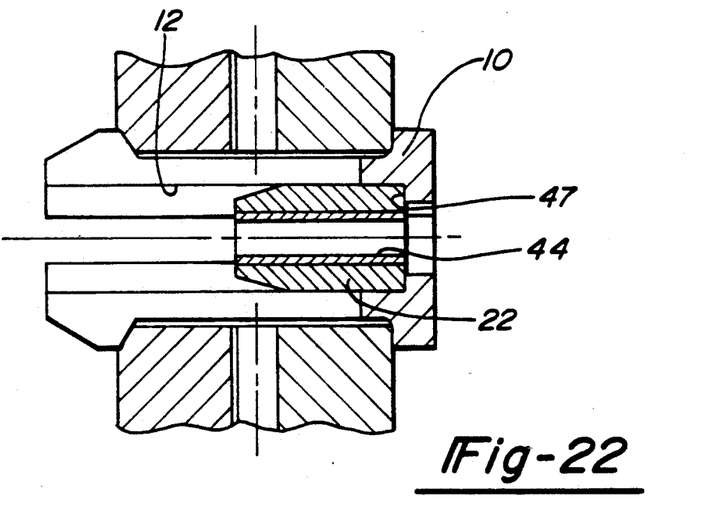

Referring to FIG. 22, the tensioning sleeve 10, in the region of the bore 12, is provided with a stop shoulder 47 and the tensioning pin is provided with a threaded bore 44. With the help of a suitable dismantling tool, the threaded bore 44 in the tensioning pin 22 permits the tensioning pin to be withdrawn until it reaches the stop shoulder 47 of the tensioning sleeve 10. By pulling the tensioning pin 22 further, it is possible to withdraw the tensioning sleeve 10 and thus unfasten the flange connection.

Figure 23A:
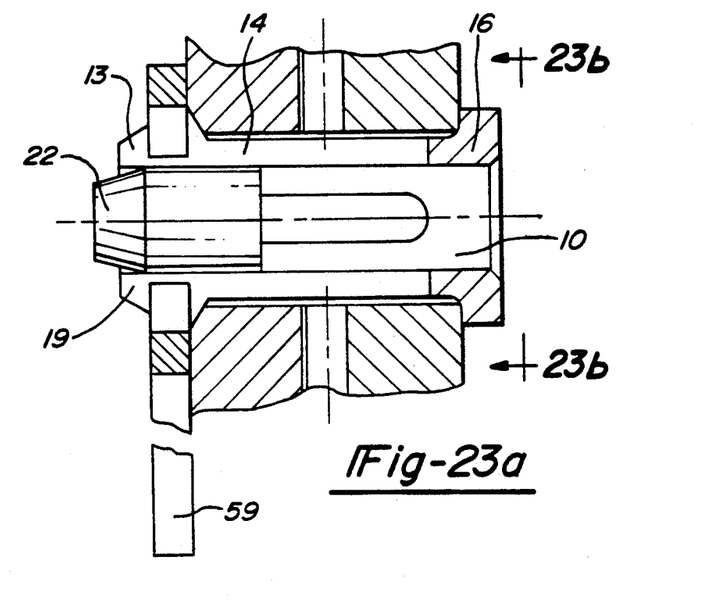
Figure 23B:
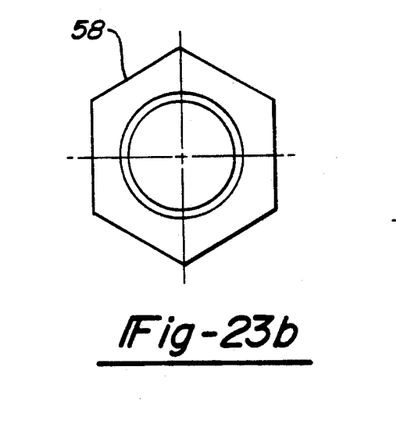
Figure 23C:
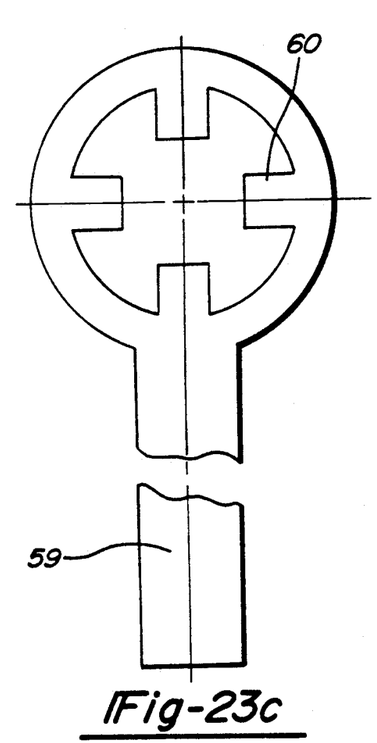

FIGS. 23a–c show an alternative embodiment. Referring to FIG. 23a, the collar 16 of the tensioning sleeve 10 is provided with a suitable spanner face 58 (FIG. 23b which is an end view as seen from line 23b—23b in FIG. 23a). Spanner face 58 may be engaged by a commercial tool, such as an annular spanner for hexagon bolts. As illustrated in FIG. 23c, a spanner 59 provided with projections 60 engaging the slots 13 (FIG. 23a) may be positioned on the collar 19. By turning the spanner 59 and ensuring a counter-action by the annular spanner at the collar 19 the segments 14 may be extended and deformed to such an extent that they tear off, thereby unfastening the connection.

EXAMPLE

For a typical embodiment of such a flange connection, the following dimensions in millimeters (mm) are proposed:

| X | thickness of both flanges | 28 mm |
|---|---|---|
| L | length of sleeve | 27 mm |
|   | diameter of tensioning pin 22 | 10 mm |
|   | bore of tensioning sleeve 10 | 10 mm |
|   | shank/diameter of tensioning sleeve | 15 mm |
|   | bore 8, 9 of flanges | 17 mm |
|   | outer diameter of collar 16 of tensioning sleeve | 21 mm |

The material may be 41 Cr 4 for example.

While the above detailed description describes the preferred embodiment of the present invention, it will be understood that the present invention is susceptible to modification, variation and alteration without deviating from the scope and fair meaning of the subjoined claims.

What is claimed is:

1. A fastener for securing a first workpiece with a first bore to a second workpiece with a second bore comprising:
   a tensioning sleeve having an axis with an introduction end and a stop end for insertion into said first then second bore;
   a pin bore disposed within said tensioning sleeve along said axis;
   at least one axial slot in said tensioning sleeve originating at said introduction end;
   a first collar integral with the tensioning sleeve in proximity to the stop end of said tensioning sleeve having a diameter larger than the diameter of the tensioning sleeve;
   a second collar integral with the tensioning sleeve in proximity to the introduction end;
   a tensioning pin coaxially disposable within said pin bore wherein movement of said tensioning pin within said pin bore radially expands said second collar to a diameter greater than said second bore and lengthens said tensioning sleeve between said first and second collar along said axis to a length compressively assembling the said first and second workpieces.

2. A connector for securing a first workpiece with a first thickness having a first bore through said first thickness to a second workpiece having a second thickness and a second bore through said second thickness, comprising:
   a tensioning sleeve having an introduction end and a second end, said introduction end introduced through said first bore into said second bore wherein said first and second bore are in an aligned relationship;
   at least one slot running axially along said tensioning sleeve;
   a pin bore axially disposed along the longitudinal axis of and within said tensioning sleeve;
   a stop integral with said second end of said tensioning sleeve having a contact face for abutting said first workpiece;
   a further collar integral with said introduction end having a supporting face;
   a tensioning pin disposable within said pin bore for radially expanding said further collar to a diameter larger than said second bore and for displacing said further collar supporting face into abutting relation to said second workpiece whereby the axial length of said tensioning sleeve between said second collar supporting face and said stop contacting face is increased due to insertion of the pin to a length compressively assembling said first and second workpieces.

3. The connector of claim 2 wherein said increase in axial length is at least in the range of elastic elongation of said tensioning sleeve but less than the length at which said tensioning sleeve ruptures.

4. The connector of claim 2 wherein said supporting face is inclined at a first angle ($\alpha$) less than 90° relative to the longitudinal axis of the tensioning sleeve.

5. The connector of claim 4 wherein said angle ($\alpha$) is equal to about 60°.

6. The connector of claim 4 further comprising:
   an abutment face disposed about said second bore in said second workpiece, wherein the abutment face is inclined at a second angle ($\beta$) equal to said first angle ($\alpha$).

7. The connector of claim 2, wherein said tensioning pin is shorter than the tensioning sleeve.

8. The connector of claim 2, wherein the length of said tensioning pin is equal to about the length of said tensioning sleeve.

9. The connector of claim 2, wherein the length of said tensioning pin is greater than the length of said tensioning sleeve.

10. The connector of claim 8 further comprising a head integral with one end of said tensioning pin and having a diameter larger than said pin bore.

11. The connector of claim 2 further comprising means for resisting removal of said tensioning pin from said tensioning sleeve after assembly, said resisting means associated with said tensioning sleeve introduction end.

12. The connector of claim 11 wherein said securement means further comprises securing ring concentrically disposed about said tensioning pin for resisting removal of said tensioning pin from said tensioning sleeve.

13. The connector of claim 2 further comprising:
   head means integral with one end of said tensioning pin for preventing over insertion of said tensioning pin;
   annular groove means concentrically disposed in the end of said tensioning pin opposite said head means such that said annular groove clears said tensioning sleeve after assembly;
   securing ring means adapted to be received in said annular groove means for resisting withdrawal of said transitioning pin relative to said tensioning sleeve.

14. The connector of claim 2 further comprising:
   first annular groove concentrically disposed around tensioning pin;
   second annular groove concentrically disposed upon said tensioning sleeve adjacent said pin bore for aligning with said first annular groove when said tensioning pin is in an assembled state; and
   securing ring disposed with said first and second annular groove when said tensioning pin is in an assembled state for resisting removal of said tensioning pin.

15. The connector of claim 11 wherein said removal resisting means further comprises:
   locking projection integral with an end of the tensioning pin adapted to be inserted into and project beyond the tensioning sleeve upon assembly and resist retraction by contact with said tensioning sleeve.

16. The connector of claim 11 further comprising: first micro-teeth projecting from said tensioning pin; and second micro-teeth projecting from said pin bore in the region of the second end which engage said first micro-teeth upon assembly of said connector.

17. The connector of claim 11 wherein said removal resisting means further comprising the pin bore having a small recess with a layer of glue.

18. The connector of claim 11, wherein said removal resisting means comprises:

a pin recess disposed within and of a larger diameter than said pin bore for containing the length of said tensioning pin in the assembled condition of said connector.

19. The connector of claim 2 further comprising:
a counter-flange recess on the face of said second workpiece radially disposed about said second bore, said counter-flange recess engaging said further collar in a partially assembled condition for resisting removal of said tensioning sleeve.

20. The connector of claim 2 further comprising:
means for increasing the outer diameter of said tensioning sleeve for temporarily securing said sleeve to said first workpiece prior to assembly.

21. The connector of claim 2 further comprising:
an annular face disposed within said pin bore for supporting an ejecting tool acting in the direction of the introducing end of the tensioning sleeve.

22. The connector of claim 21 further comprising:
a bored step extending from said stop of the tensioning sleeve to said annular face.

23. The connector of claim 18 wherein said tensioning pin forms a supporting basis for an ejecting tool.

24. The connector of claim 2 further comprising:
a threaded bore axially disposed within said tensioning pin.

25. The connector means of claim 24 further comprising a stop shoulder at at least one end of said sleeve for supporting a threaded withdrawal tool.

26. The connector of claim 2 wherein said pin bore tapers inwardly from said introduction.

27. The connector of claim 2 wherein said pin bore is partially threaded.

28. The connector of claim 2 further comprising hex nut means associated with said first collar for cooperatively engaging a wrench.

29. The connector of claim 2 wherein:
said first workpiece further comprises a first flange; and
said second workpiece further comprises a second flange.

30. The connector of claim 29 wherein:
said first flange is operatively associated with a drive shaft of a self-propelled vehicle; and
said second flange is operatively associated with the driving flange of said vehicle.

* * * * *

UNITED STATES PATENT AND TRADEMARK OFFICE
CERTIFICATE OF CORRECTION

PATENT NO. : 5,259,689
DATED : November 9, 1993
INVENTOR(S) : Ernst B. Arand et al It is certified that error appears in the above-indentified patent and that said Letters Patent is hereby corrected as shown below:

Column 4, line 37, "25" should be --23--.

Column 4, line 59, insert --1-- after "shaft".

Column 6, line 61, "7b-17b" should be --7b-7b--.

Column 7, line 57, "With" should be --with--.

Column 8, line 12, insert --.-- after "14".

Signed and Sealed this

Twenty-eighth Day of June, 1994

Attest:

BRUCE LEHMAN

*Attesting Officer*  *Commissioner of Patents and Trademarks*